United States Patent [19]
Hatakenaka et al.

[11] Patent Number: 6,079,464
[45] Date of Patent: Jun. 27, 2000

[54] STUDLESS TIRE HAVING LATERAL GROOVES

[75] Inventors: Kenji Hatakenaka, Kobe; Keiji Shimizu, Kakogawa; Toru Kawai, Nishinomiya; Hidehiko Hino, Amagasaki, all of Japan

[73] Assignee: Sumitomo Rubber Industries, Ltd, Hyogo-ken, Japan

[21] Appl. No.: 09/163,569

[22] Filed: Sep. 30, 1998

[30] Foreign Application Priority Data

Sep. 30, 1997 [JP] Japan .................................. 9-266279

[51] Int. Cl.$^7$ ........................... B60C 11/11; B60C 11/13; B60C 103/00; B60C 107/00
[52] U.S. Cl. ...................... 152/209.24; 152/902
[58] Field of Search ............................. 152/209.1, 209.5, 152/209.18, 209.21, 209.24, 902

[56] References Cited

U.S. PATENT DOCUMENTS

| | | | |
|---|---|---|---|
| 2,604,920 | 7/1952 | Kirby | 152/209.18 |
| 3,707,177 | 12/1972 | Boileau | 152/209.18 |
| 4,446,901 | 5/1984 | Endo et al. | 152/209.24 |
| 4,735,247 | 4/1988 | Makino et al. | 152/209.5 |
| 5,044,414 | 9/1991 | Ushikubo | 152/209.24 |
| 5,127,455 | 7/1992 | Remick | 152/209.24 |
| 5,417,268 | 5/1995 | Kishi | 152/209.24 |
| 5,526,858 | 6/1996 | Ikeda | 152/209.24 |

FOREIGN PATENT DOCUMENTS

| | | | |
|---|---|---|---|
| 520755 | 12/1992 | European Pat. Off. | 152/209.24 |
| 61-60308 | 3/1986 | Japan | 152/209.24 |
| 61-200007 | 9/1986 | Japan | 152/209.24 |
| 4-100707 | 4/1992 | Japan | 152/209.24 |
| 4-345503 | 12/1992 | Japan | 152/209.24 |
| 962034 | 9/1982 | U.S.S.R. | 152/209.24 |

*Primary Examiner*—Steven D. Maki

[57] ABSTRACT

A pneumatic tire comprises: a tread rubber having a Shore A hardness of not more than 65 degrees at 20 degrees C.; a tread portion provided with at least one circumferential row of blocks having circumferential edges adjacent to lateral grooves; each of the circumferential edges having a mean inclination angle of 0 to 60 degrees with respect to the tire axial direction; sidewalls of the lateral grooves on one side in the tire circumferential direction each comprising a first upper slope extending from the top of the adjacent block to a first point at a depth h1, while inclining at an angle $\alpha 1$, and a first lower slope extending from said first point towards the groove bottom, while inclining at an angle $\alpha 2$ smaller than the angle $\alpha 1$,; the remaining sidewalls of the lateral grooves on the other side each comprising a second upper slope extending from the top of the adjacent block to a second point at a different depth h2 than said depth h1, while inclining at an angle $\beta 1$, and a second lower slope extending straight from the second point towards the groove bottom, while inclining at an angle $\beta 2$ smaller than the angle $\beta 1$; and the lateral grooves comprising a portion (A) in which the depth h1 is more than the depth h2 but not more than 0.8 times the lateral groove depth, and a portion (B) in which the depth h2 is more than the depth h1 but not more than 0.8 times the lateral groove depth.

4 Claims, 5 Drawing Sheets

STUDLESS TIRE HAVING LATERAL GROOVES

The present invention relates to a pneumatic tire, more particularly to an improved tread structure for studless tires being capable of improving uneven wear resistance without deteriorating snow performances.

In general, studless tires used on wet and dry conditions are provided with block type tread patterns to obtain massive grip on snowy roads. Further, in the tread portion relatively soft rubber compounds are used to improve friction and adhesion to icy road surfaces, whereby snow performances or running performances on snowy and icy roads are provided.

Such tires are however, as the tread rubber is soft, when running on dry roads in particular, circumferential ends or edges of the blocks are liable to wear partially as shown in FIGS. 5(a) and (b), and the wear is usually larger in the toe-side edge (b) than the heel-side edge (a). This is particularly remarkable in taxi tires. This type of uneven wear is called "step wear" and it is liable to generate uncomfortable sound and also liable to shorten the tire life.

If the depth of lateral grooves is decreased, the rigidity of blocks is increased and step wear may be decreased. However, as the tread rubber wears, the groove volume becomes insufficient and wet performances greatly decreases.

It is therefore, an object of the present invention to provide a studless tire in which the uneven wear resistance is improved without sacrificing wet performances.

According to the present invention, a pneumatic tire comprises
- a tread portion defined by a tread rubber having a Shore A hardness of not more than b 65degrees at 20 degrees C., the tread portion provided with at least one circumferential row of blocks,
- the blocks in each row circumferentially divided by lateral grooves and having circumferential edges adjacent to the lateral grooves,
- each of the circumferential edges having a mean inclination angle of 0 to 60 degrees with respect to the tire axial direction, wherein the mean inclination angle is defined as of a straight line drawn between the axial ends of the circumferential edge,
- sidewalls of the lateral grooves on one side in the tire circumferential direction each comprising a first upper slope and a first lower slope, the first upper slope extending from the top of the adjacent block to a first point at a depth h1, while inclining at an angle $\alpha 1$, the first lower slope extending from said first point towards the groove bottom, while inclining at an angle $\alpha 2$ smaller than the angle $\alpha 1$, the remaining sidewalls of the lateral grooves on t he other side each comprising a second upper slope and a second lower slope, the second upper slope extending from the top of the adjacent block to a second point at a different depth h2 than said dept h1, while inclining at an angle $\beta 1$, the second lower slope extending straight from the second point towards the groove bottom, while inclining at an angle $\beta 2$ smaller than the angle $\beta 1$, wherein the inclining directions of all the slopes are such that the width of the lateral grooves decrease radially inward, and all the angles are measured with respect to a normal direction to the block top in a cross section at a right angle to the lateral groove, and with respect to each of the lateral grooves, in a portion (A), the depth h1 is more than the depth h2 but not more than 0.8 times the lateral groove depth, and in another portion (B), the depth h2 is more than the depth h1 but not more than 0.8 times the lateral groove depth.

Preferably, the above-mentioned portion (A) corresponds to one of axial end parts of the lateral groove and the portion (B) corresponds to the other axial end part. The axial positions of the potion (A) and potion (B) are reversed between the axially adjacent rows.

An embodiment of the present invention will now be described in detail in conjunction with the accompanying drawings.

Figure 5A:
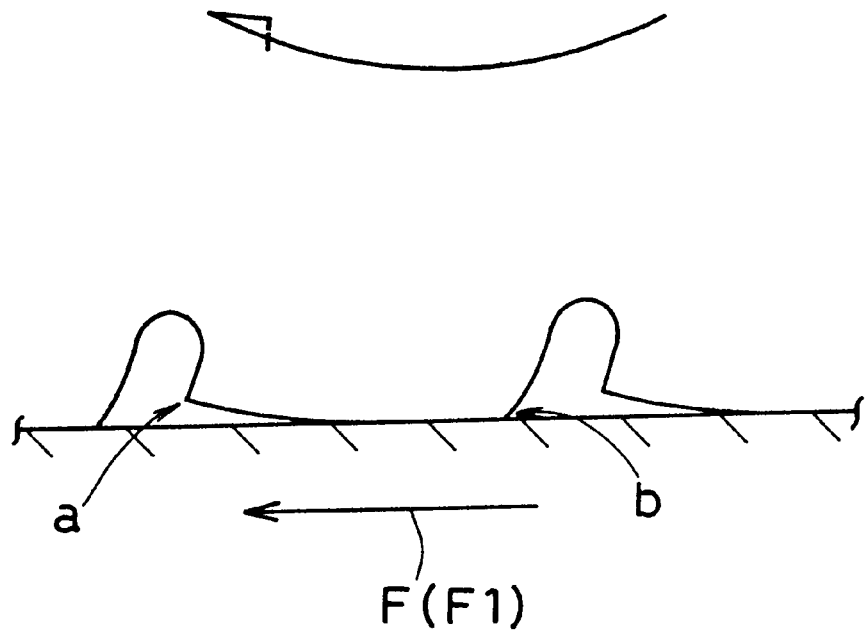

FIGS. 5(a) and (b) are diagrams for explaining uneven wear called step wear.

Figure 6:
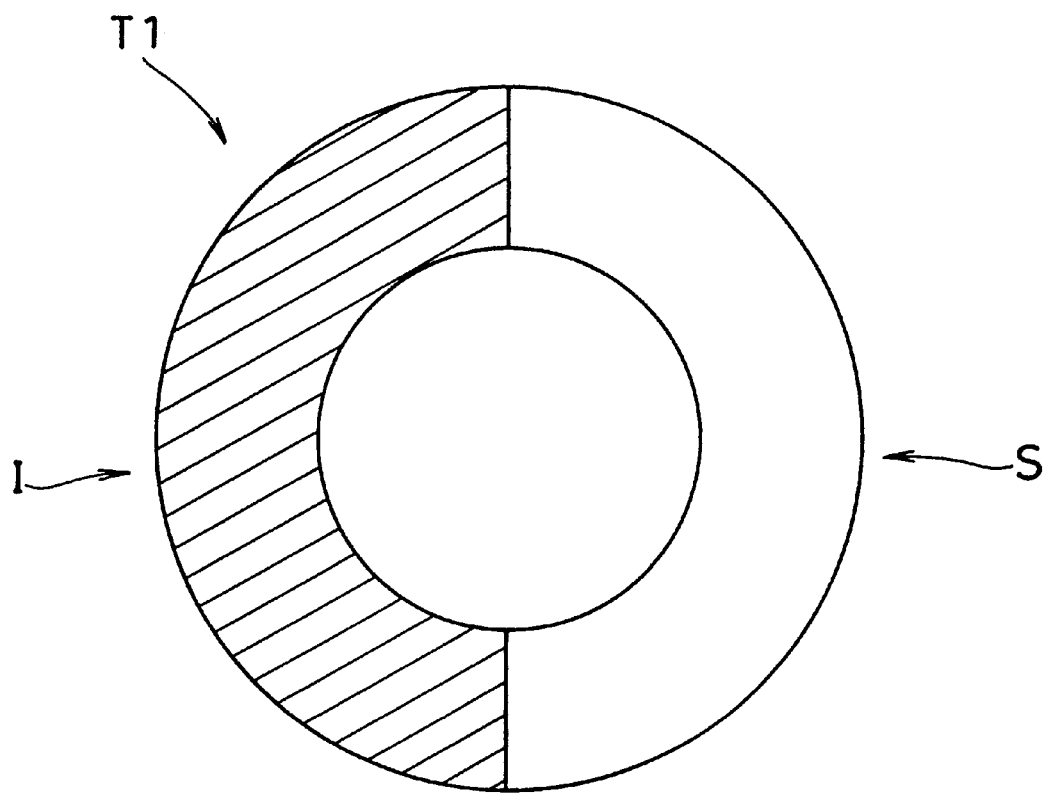

FIG. 6 is a diagram for explaining a test tire T1 used in uneven wear test.

In this embodiment, a studless tire according to the present invention is a belted radial ply tire, which comprises a tread portion, a pair of axially spaced bead portions, a pair of sidewall portions extending therebetween, a carcass extending between the bead portions, a belt disposed radially outside the carcass and inside a tread rubber.

The tread rubber has a Shore A hardness of not more than 65 degrees but preferably not less than 45 degrees at a temperature of 20 degrees C., and the radially outer surface thereof defines the tread. If the hardness is more than 65 degrees, required adhesiveness and friction on icy roads can not be obtained. Thus, ice grip is liable to decrease. If the hardness is excessively low, for example less than 45 degrees, the wear resistance and snow grip greatly decrease.

The tread portion is provided with main grooves 2 extending continuously in the tire circumferential direction and lateral grooves 3 extending crosswise to the main grooves 2 to form rows of blocks 5.

Figure 1:
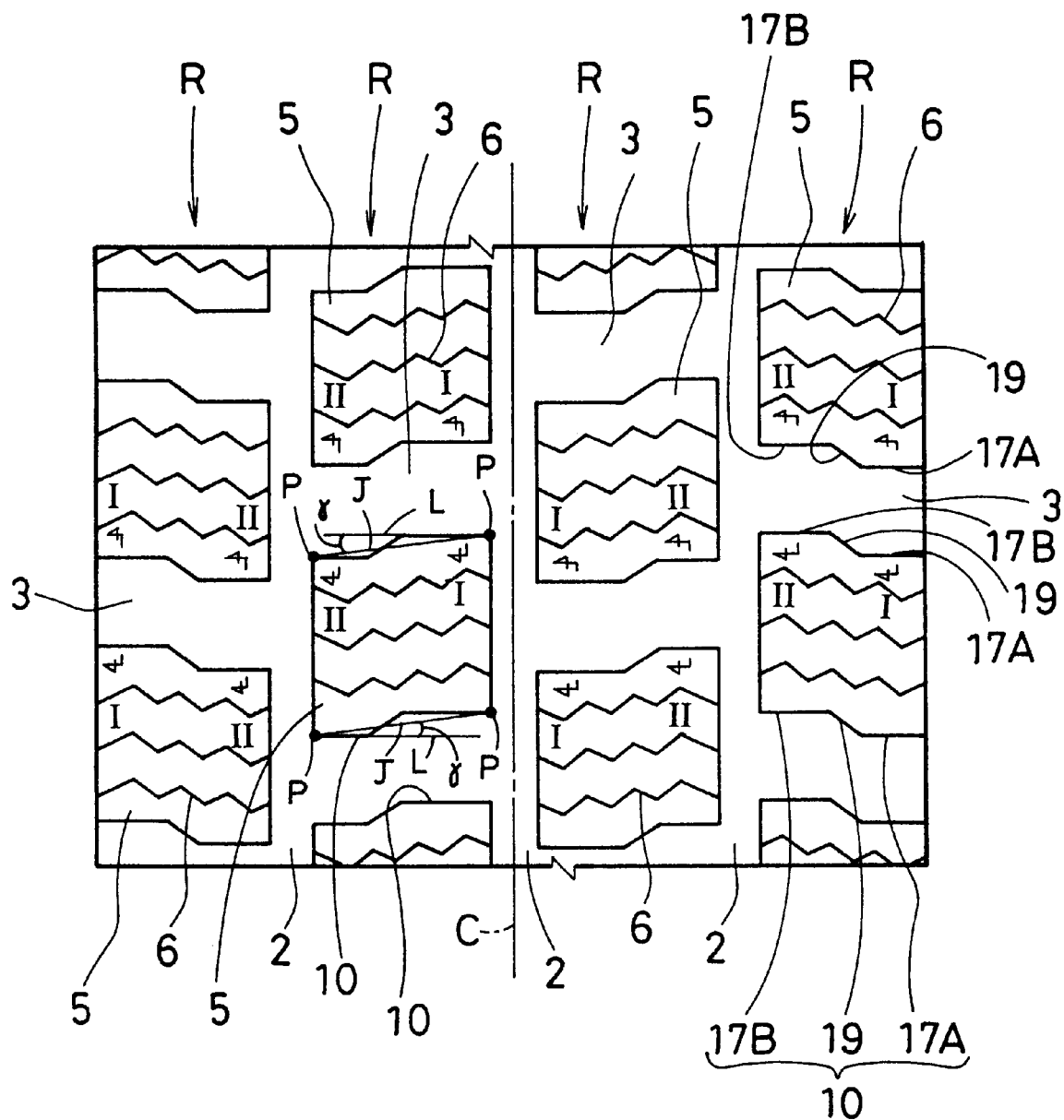
FIG. 1 is a developed partial plan view of a tire according to the present invention showing an example of the tread pattern thereof.

In FIG. 1 showing an example of the tread pattern, the main grooves 2 comprise three straight grooves; a central groove on the tire equator C and a side groove on each side thereof. The lateral grooves 3 comprise axially inner grooves each extending from the central groove to one of the side grooves, and axially outer grooves each extending from one of the side grooves to the adjacent tread edge. Each of the lateral grooves 3 has a crank-shaped configuration. Thus, the tread portion is divided into four rows R of circumferentially spaced blocks 5.

The main grooves 2 and lateral grooves 3 have a groove top width of 6 to 20 mm and a maximum groove depth H of 8 to 13 mm under a normally inflated state, for example.

For the main grooves 2, apart from a straight configuration, various zigzag or wavy configurations may be used. But a gentle wave or zigzag is preferable. On the other hand, for the lateral grooves 3, apart from a crank shape or zigzag shape, various shapes, e.g. straight, wavy or curved configurations may be used.

Each of the blocks 5 has a pair of circumferential edges 10 and a pair of axial edges. Here, a circumferential edge 10 is an edge formed between the top face of the block and a side face thereof facing one of the lateral groove, namely a sidewall of the lateral groove. Thus, it can be said that the circumferential edge 10 is the upper edge of the sidewall of the lateral groove.

As shown in FIG. 1, the blocks 5 are each provided with at least one sipe extending from one of the axial edges to the other. In this example a plurality of parallel zigzag sipes 6 are formed, which extend generally parallel with the tire axial direction.

In this example, as the main grooves are straight, the axial edges of the blocks in each row are straight and arranged in line. On the other hand, as the lateral grooves 3 are a crank shape, the circumferential edges 10 also have a crank shape. Thus, each circumferential edge 10 comprises side parts 17A and 17B extending substantially parallel to the tire axial direction and an inclined middle part 19 extending therebetween.

A mean inclination angle $\gamma$ of each circumferential edge 10 is set in the range of from 0 to 60 degrees with respect to the tire axial direction. Here, the mean inclination angle $\gamma$ is defined as the angle of a straight line J drawn between the axial ends P of the edge 10. If the angle $\gamma$ is more than 60 degrees, road grip is liable to become insufficient, and further acute angle corners which are liable to be torn off are formed on the blocks 5.

Each of the lateral grooves 3 has at least two different sectional shapes related to the block arrangement.

Hereinafter, sidewalls of the lateral grooves 3 on one side in the tire circumferential direction are referred to as sidewall 9A. and the remaining sidewalls on the other side as sidewall 9B.

Figure 2A:
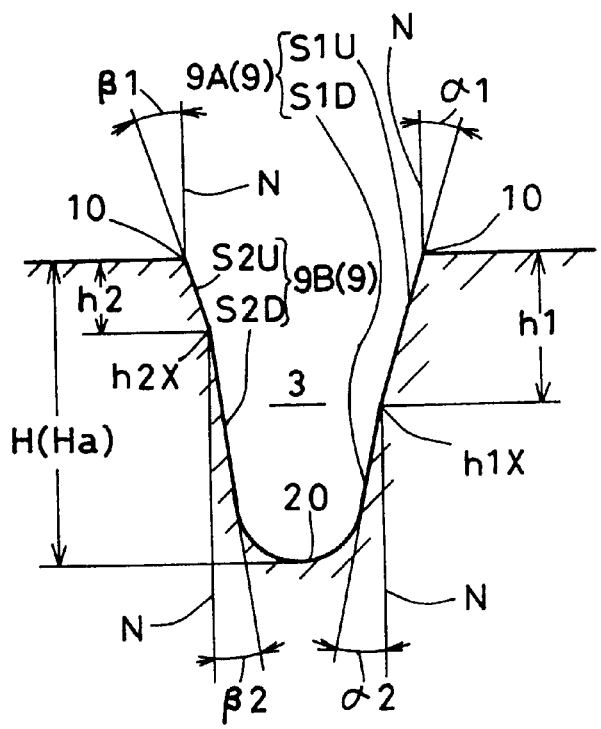
FIG. 2(a) is a cross sectional view taken along a line I—I of FIG. 1.
Figure 2B:
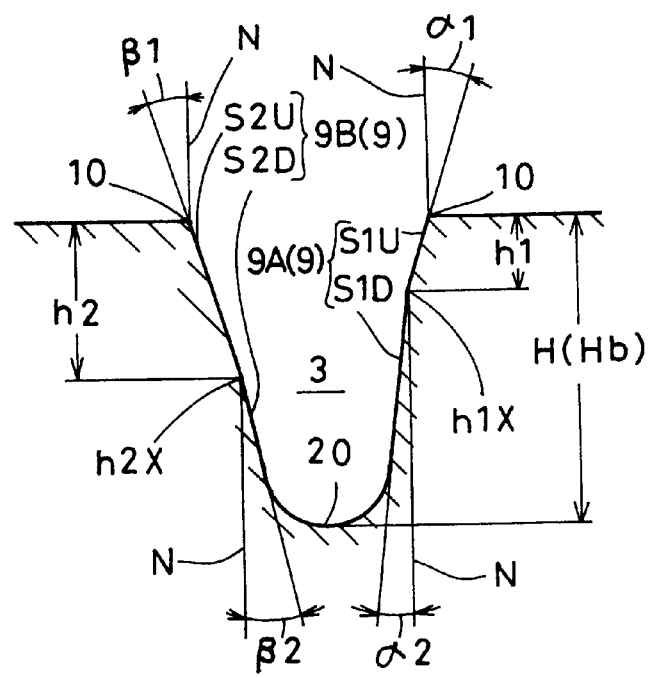
FIG. 2(b) is a cross sectional view taken along a line II—II of FIG. 1.

As for each of the lateral grooves 3, as shown in FIGS. 1, 2(*a*) and 2(*b*), the sidewall 9A comprises a first upper slope S1U and a first lower slope S1D, and the sidewall 9B comprises a second upper slope S2U and a second lower slope S2D. The first upper slope S1U extends straight from the block top to a first point h1X at a depth h1, while inclining at an angle $\alpha$1. The first lower slope S1D extends straight from the first point h1X towards the groove bottom, while inclining at an angle $\alpha$2 smaller than the angle $\alpha$1. The second upper slope S2U extends straight from the block top to a second point h2X at a different depth h2 than the depth h1, while inclining at an angle $\beta$1. The second lower slope S2D extends straight from the second point h2X towards the groove bottom, while inclining at an angle $\beta$2 smaller than the angle $\beta$1. The inclining directions of all the slopes are such that the lateral groove width decreases radially inward, and all the angles are measured with respect to a normal direction N to the block top in a cross section at a right angle to the lateral groove 3.

Besides, the groove bottom 20 extending between the two sidewalls 9A and 9B is defined by an arc. This arc is connected to the straight lines of the sidewalls without forming an inflection point.

With respect to each of the block rows R, in an axial position (A) the sectional shape at which is shown in FIG. 2(*a*), the depth h1 of the first point h1X is more than the depth h2 of the second point h2X, and the ratio h1/Ha of the depth h1 to the groove depth Ha(H) thereat is not more than 0.8 preferably not more than 0.6, but not less than 0.3 preferably not less than 0.4. Further, in another axial position (B) the sectional shape at which is shown in FIG. 2(*b*), the depth h2 of the second point h2X is more than the depth h1 of the first point h1X, and the ratio h2/Hb of the depth h2 to the groove depth Hb(H) is not more than 0.8 preferably not more than 0.6, but not less than 0.3 preferably not less than 0.4.

In this embodiment, the axial positions (A) and (B) correspond to the axially outer end parts of the lateral grooves, that is, the above-mentioned axial parts 17A and 17B.

In regard to the axial positions (A) and (B) in each row R, as shown in FIG. 1, the positions (A) and (B) are reversed between the left-hand row and right-hand row of each of the main grooves 2. In other words, the axial positions of the two different cross-sectional shapes (I—I section and II—II section) are symmetrical about the main groove 2.

| | Axial position | |
| Block Row | Left | Right |
| --- | --- | --- |
| Left | I-I | II-II |
| Mid-left | II-II | I-I |
| Mid-right | I-I | II-II |
| Right | I-I | II-II |

In such arrangement, the deformation (twist) of the blocks during braking and acceleration may be canceled between the adjacent rows to improve the uneven wear resistance.

In this example, accordingly, the sectional shapes are combined with axial positions rather than the lateral groove shape. However, it may be possible to combine the sectional shapes with the lateral groove shape such that, for example as in the right row and mid-right row, protruding parts of the blocks have a longer upper slope than that of the opposite side.

Further, if attention is paid to the sidewall 9A, the depth h1 of the first point h1X is larger in the position (A) than the position B, and the angle $\alpha$1 is 8 to 20 degrees in the position (A) and 8 to 15 degrees in the position (B), and the angle $\alpha$2 is 3 to 10 degrees in the position (A) and position (B).

If attention is paid to the other sidewall 9B, the depth h2 of the second point h2X is smaller in the position (A) than the position (B), and the angle $\beta$1 is 8 to 15 degrees in the position (A) and 8 to 20 degrees in the position (B), and the angle $\beta$2 is 3 to 10 degrees in the position (A) and position (B).

If the angles are over the above-mentioned ranges, the edge effect from the circumferential edges 10 on icy roads decreases, and the lateral groove volume decreases to deteriorate the drainage performance and snow performance. If the angles are under the above-mentioned ranges, it becomes difficult to improve the uneven wear resistance.

Thus, the constructions are reversed between the position (A) and the position (B), and the changings are gradually made through a transitional part which is the incline middle part 19. In the part 17A and part 17B, the depth and angles are not changed.

As the sidewalls 9A and 9B of the lateral grooves or the blocks are provided with a double-sloped structure, the blocks 5 can be increased in the circumferential rigidity. Further, as the lateral groove 3 has at least two different sectional shapes, deformations of the blocks 5 during braking and acceleration can be effectively controlled, and the uneven wear resistance can be improved.

If the ratio h1/Ha, h2/Hb is more than 0.8 or less than 0.3, the above-mentioned effect on improving the block rigidity decreases and the uneven wear resistance is not improved sufficiently.

Further, as to the arrangement of the lateral grooves in each of the block rows R. all the lateral grooves 3 are arranged in the same way, and in this example, the lateral grooves are generally inclined to the same direction due to the crank shape. In FIG. 1, the inclinations are, from the left row to the right row, left-side upward, right-side upward, right-side upward and left-side upward. Furthermore, between the axially adjacent rows R, the circumferential pitches of the lateral grooves are shifted by about one half pitch. Therefore, the tread pattern is a bidirectional tread pattern independently of the above-mentioned arrangement of the two different sectional shapes.

Test tire T1 having the block pattern shown in FIG. 1 were made and tested for uneven wear (step wear) resistance. As shown in FIG. 6, one half part I of a test tire T1 is constructed according to the present invention, but the other half part S according to a prior art. The specifications are given in Table 1.

1) Uneven wear resistance Test

Figure 5B:
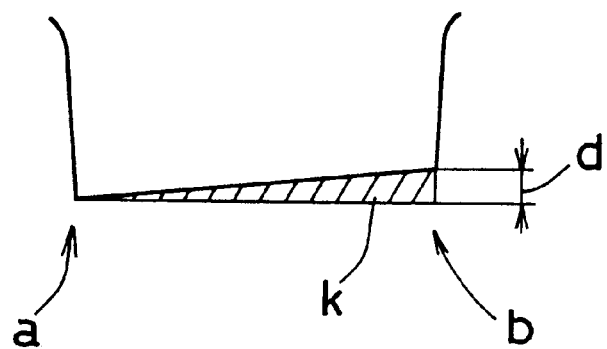

As a test car, a 2000 cc FF passenger car provided on the front axle with the test tires T1 was run on a dry test course at a speed 80 km/h, and the average of uneven wear d (FIG. 5(b)) was measured at running distances of 3000 km, 6000 km and 9000 km.

Figure 3:
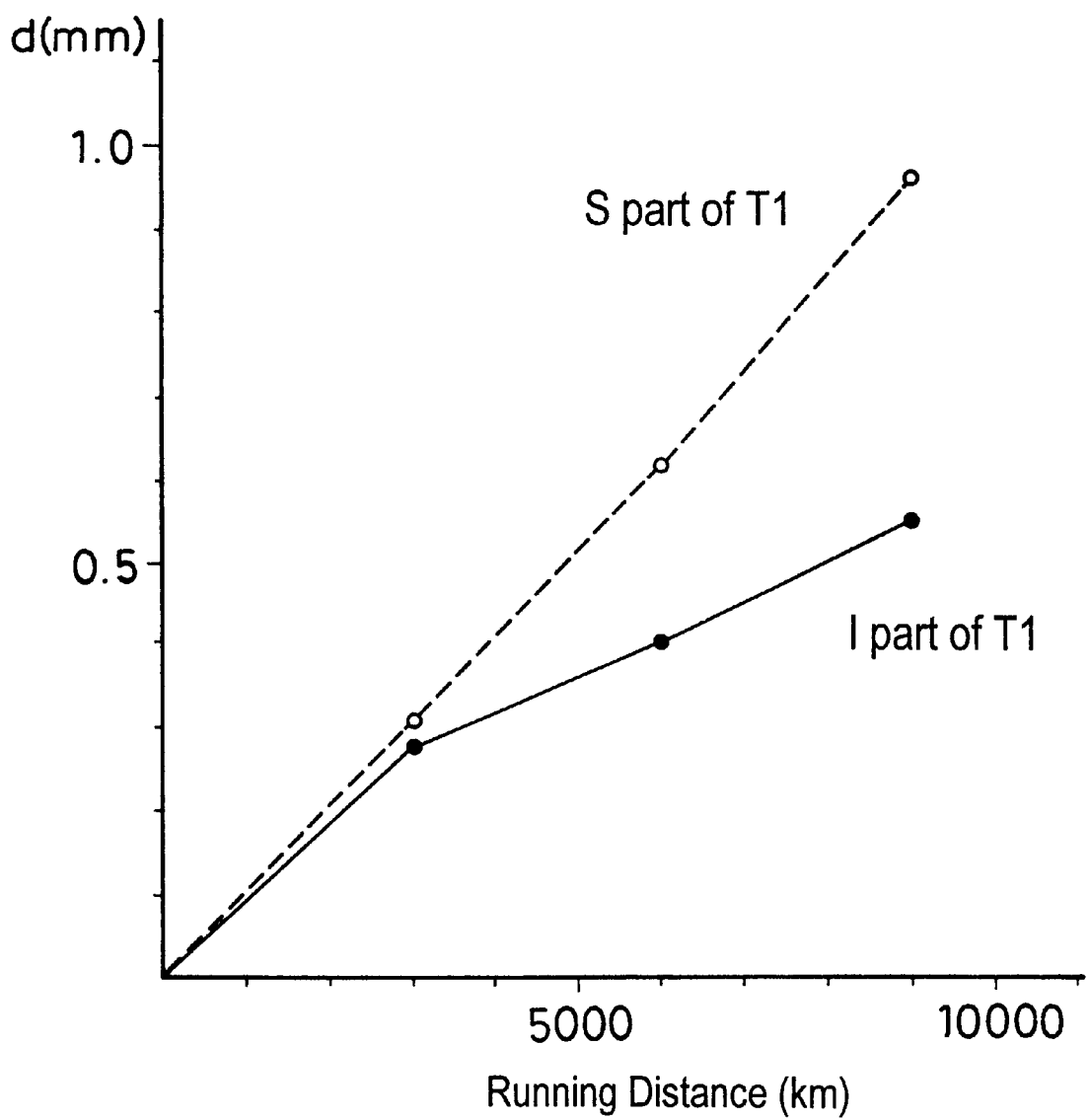
FIG. 3 is a graph showing the results of uneven wear tests.

The results are indicated in Table 1 by an index based on that the conventional structure in the part S is 100, wherein the larger the index, the smaller the uneven wear. The results are also shown in FIG. 3.

TABLE 1

Figure 4:
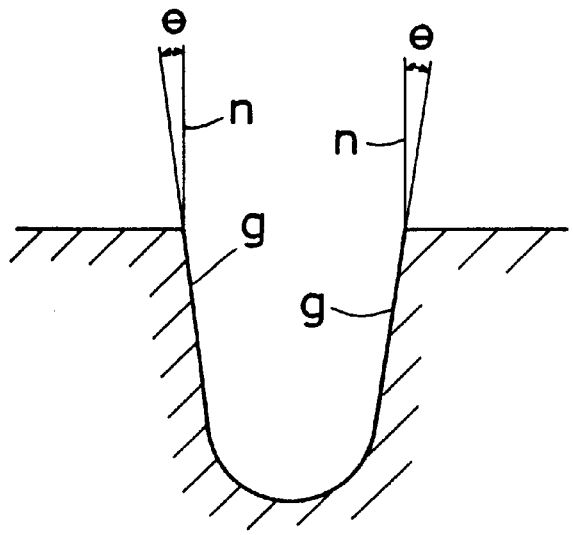
FIG. 4 is a cross sectional view of a lateral groove showing a conventional cross sectional shape thereof.

| Tire T1 | I part Invention | S part Conventional |
|---|---|---|
| Tread rubber hardness | 50 deg | 50 deg |
| Tread pattern | FIG. 1 | FIG. 1 |
| γ (deg) | 8 | 8 |
| Lateral groove | | |
| Sectional shape | FIG. 2(a, b) | FIG. 4 |
| α1 (deg) | 20 | θ = 8 |
| α2 (deg) | 5 | |
| β1 (deg) | 20 | θ = 8 |
| β2 (deg) | 5 | |
| H (mm) | 10 | 10 |
| Section A | | |
| h1 (mm) | 5 | — |
| h2 (mm) | 3 | — |
| Ha (mm) | 10 | — |
| h1/Ha | 0.5 | — |
| Section B | | |
| h1 (mm) | 3 | — |
| h2 (mm) | 5 | — |
| Hb (mm) | 10 | — |
| h2/Hb | 0.5 | — |
| Test results | | |
| Uneven wear | | |
| 3000 km | 110 | 100 |
| 6000 km | 155 | 100 |
| 9000 km | 175 | 100 |

Further, test tires of size 175/80R14 having the same internal construction and the same block pattern shown in FIG. 1 except for the lateral groove sidewall construction were made and tested for snow performances. The specifications are shown in Table 2.

2) Snow performance test

The test tires were mounted on the front axle of a 2000 cc FF passenger car.

2-1) On-the-snow braking performance test

Running the test car on a test course covered with trodden-down snow, a wheel-lock brake was made at a running speed of 40 km/h to measure the running distance to stop.

2-2) On-the-ice braking performance test

Running the same test car on an icy test course, a wheel-lock brake was made at a running speed of 30 km/h to measure the running distance to stop.

In each test, the measurement was made ten times to obtain the average value. The results are indicated in Table 2 by an index based on that the reference tire is 100, wherein the larger the index, the better the performance.

TABLE 2

| Tire | Ex. | Ref. |
|---|---|---|
| Tread rubber hardness | 50 deg | 50 deg |
| Tread pattern | FIG. 1 | FIG. 1 |
| γ (deg) | 8 | 8 |
| Lateral groove | | |
| Sectional shape | FIG. 2(a, b) | FIG. 4 |
| α1 (deg) | 20 | θ = 8 |
| α2 (deg) | 5 | — |
| β1 (deg) | 20 | θ = 8 |
| β2 (deg) | 5 | — |
| H (mm) | 10 | 10 |
| Section A | | |
| h1 (mm) | 5 | — |
| h2 (mm) | 3 | — |
| Ha (mm) | 10 | — |
| h1/Ha | 0.5 | — |
| Section B | | |
| h1 (mm) | 3 | — |
| h2 (mm) | 5 | — |
| Hb (mm) | 10 | — |
| h2/Hb | 0.5 | — |
| Test results | | |
| Braking test | | |
| on snow | 102 | 100 |
| on Ice | 100 | 100 |

From the test results, it was confirmed that the tires according to the present invention can be improved in the uneven wear resistance, while maintaining the snow performances the same level as a conventional tire.

We claim:

1. A pneumatic tire comprising a tread portion defined by a tread rubber having a Shore A hardness of not more than 65 degrees at 20 degrees C., the tread portion provided with at least one circumferential row of blocks, the blocks in each row circumferentially divided by lateral grooves and having circumferential edges adjacent to the lateral grooves, each of the circumferential edges having a mean inclination angle of 0 to 60 degrees with respect to the tire axial direction, wherein the mean inclination angle is defined as a straight line drawn between the axial ends of the circumferential edge, sidewalls (9A) of the lateral grooves on one side of the lateral grooves in the tire circumferential direction each comprising a first upper slope (S1U) and a first lower slope (S1D), the first upper slope (S1U) extending from the top of the adjacent block to a first point at a depth h1, while inclining at an angle α1, the first lower slope (S1D) extending from said first point towards the groove bottom, while inclining at an angle α2 smaller than the angle α1, the remaining sidewalls (9B) of the lateral grooves on the other side of the lateral grooves each comprising a second upper slope (S2U) and a second lower slope (S2D), the second upper slope (S2U) extending from the top of the adjacent block to a second point at a different depth h2 than said depth hi, while inclining at an angle β1, the second lower slope (S2D) extending straight from the second point towards the groove bottom, while inclining at an angle β2 smaller than the angle β1, wherein the inclining directions of all the slopes (S1U, S1D, S2U and S2D) are such that the width of each lateral groove decreases radially inward, and all the angles are measured with respect to a normal direction to the block top in a cross section at a right angle to the lateral groove, and with respect to each of the lateral grooves, in a portion (A) of the lateral groove, the depth h1 is more than the depth h2 but not more than 0.8 times the lateral groove depth, and in another portion (B) of the lateral groove, the depth h2 is more than the depth h1 but not more than 0.8 times the lateral groove depth.

2. The pneumatic tire according to claim 1, wherein said portion (A) corresponds to one of axial ends of the lateral groove and said portion (B) corresponds to the other axial end.

3. The pneumatic tire according to claim 2, wherein said at least one circumferential row of blocks is a plurality of circumferential rows of blocks, and the axial positions of the portion (A) and portion (B) are reversed between the axially adjacent rows.

4. The pneumatic tire according to claim 1, wherein said at least one circumferential row of blocks is a plurality of circumferential rows of blocks, and the axial positions of the portion (A) and portion (B) are reversed between the axially adjacent rows.

* * * * *